Aug. 27, 1957     M. SACKS     2,803,970
COLLAPSIBLE STEERING COLUMN
Filed May 1, 1956
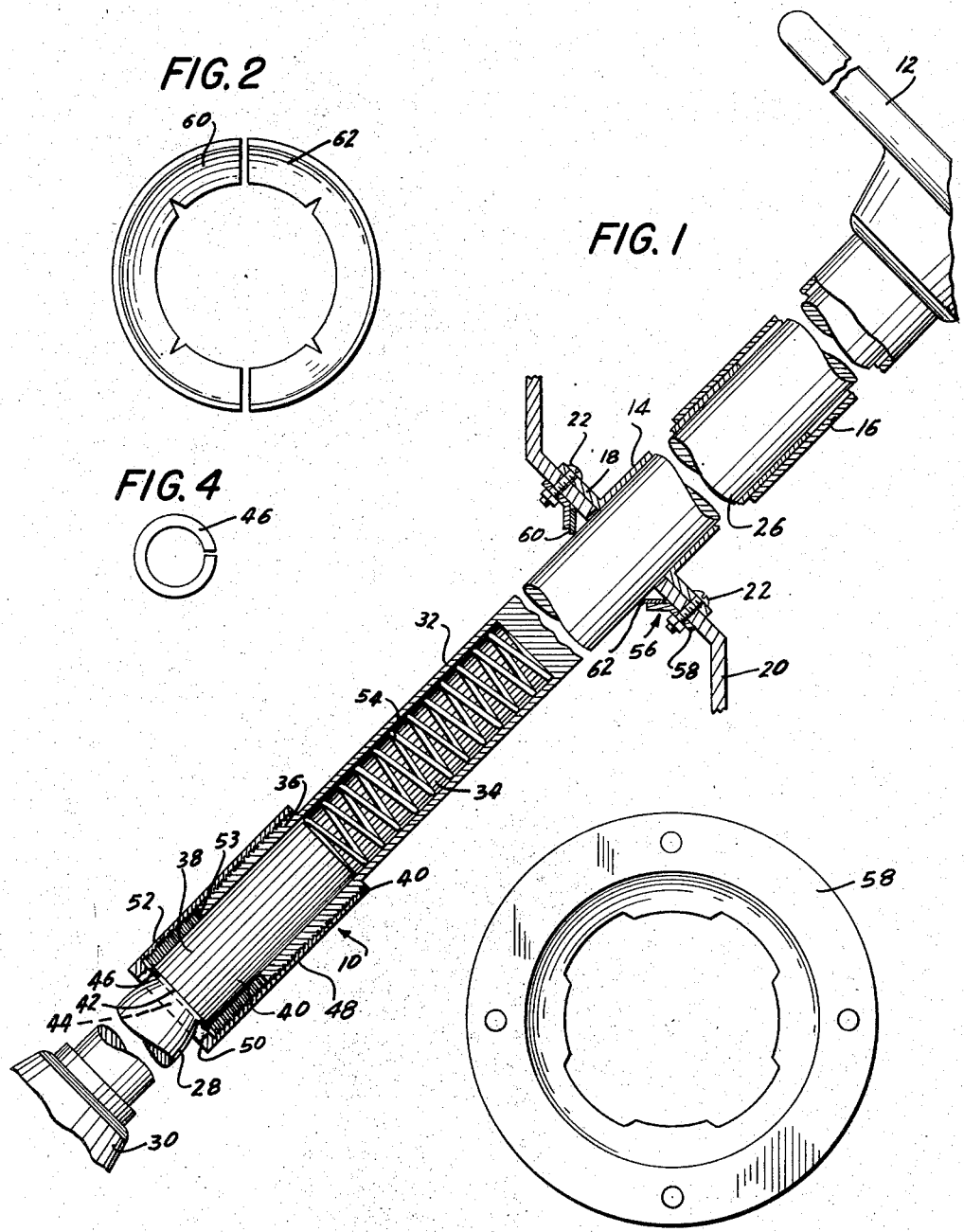
INVENTOR.
MORRIS SACKS
BY *Arthur H. Seidel*
ATTORNEY

United States Patent Office 2,803,970
Patented Aug. 27, 1957

2,803,970

COLLAPSIBLE STEERING COLUMN

Morris Sacks, Oxford, Pa.

Application May 1, 1956, Serial No. 581,940

5 Claims. (Cl. 74—493)

The present invention relates to a collapsible steering column, and more particularly to a collapsible steering column for motor vehicles which resiliently gives against the body of the driver of the vehicle upon a sudden stop, lurch, or collision of the vehicle.

The number of fatalities and serious injuries to the drivers of automotive vehicles is substantial. In many cases, such fatalities and injuries are caused by the body of the driver smashing against the steering wheel of the vehicle and sustaining serious internal injuries.

A variety of collapsible steering columns have been suggested, but have proved to be impractical, and to my knowledge there is not a single commercial vehicle presently incorporating a collapsible steering column. Thus, prior collapsible steering columns have been too intricate for satisfactory universal adoption, or due to crude engineering construction have failed to perform adequately. Most serious of all, many prior collapsible steering columns collapse upon impact with the driver's body, but then rebound with violent force, with the rebound subjecting the driver to serious injury.

Moreover, both regular and collapsible steering columns have suffered from the disability of not being adjustable to the optimum height for the customary driver of the vehicle.

The present invention has as an object the provision of a collapsible steering column which is of simple construction and relatively easy to manufacture.

The present invention has as yet another object the provision of a collapsible steering column whose height may be adjusted to conform to the optimum requirements of the customary user of the vehicle.

The present invention has as a further object the provision of a collapsible steering column of efficient construction, which may perform efficiently as a steering column throughout the entire life of the vehicle, and yet will immediately come into service as a collapsible steering column in the event of an emergency.

The present invention has as a still further object the provision of a collapsible steering column which will not rebound after having been urged to a collapsed position until deliberately released from its collapsed position.

The present invention has as a yet further object the provision of a collapsible steering column which may be readily installed on existing vehicles without requiring complex equipment and without requiring extensive modification of existing vehicles.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1 is a longitudinal sectional view with parts broken away for the purpose of clarity, through the steering column of the present invention, with the steering column in its extended or normal position, as would be the case in the routine operation of the vehicle.

Figure 2 is a plan view of the arresting means of the present invention.

Figure 3 is plan view of the retainer plate for the arresting means used in the steering column of the present invention.

Figure 4 is a plan view of the locking ring used in the present invention.

Referring to the drawings, the steering column of the present invention is designated by the numeral 10. Column 10 comprises a steering wheel portion 12 of conventional design which is carried on the upper end of steering column 10.

The housing for steering column 10 comprises a pair of telescoped housing members 14 and 16 formed of tubular sheet metal. Housing member 14 is provided at its basal portion with an annular flange 18, which is bolted to the fire wall 20 of the vehicle within which the steering column 10 is positioned by means of bolts 22. The upper housing member 16 is concentric with housing member 14 but is of larger diameter so that it may ride on the outer surface of housing member 14. The uppermost end of housing member 16 is engaged with the steering wheel portion 12 in conventional fashion.

The steering column 10 of the present invention includes a pair of steering shafts, namely upper steering shaft 26 which carries the steering wheel portion 12 and lower steering shaft 28 which extends from the vehicle's steering box 30, which steering box 30 may be of conventional design.

The lower portion of upper steering shaft 26 is provided with an axially-extending longitudinal cavity 32 whose inner wall is provided with inwardly extending parallel splines 34, and whose outer wall is threaded as at 36.

The lower steering shaft 28 extends into cavity 32 in upper steering shaft 26. Lower steering shaft 28 is provided with a splined head 38 whose splines 40 run axially and mate with the troughs between the splines 34 within cavity 32. The rear end 42 of splined head 38 is provided with a perpendicular shoulder. The portion of lower steering shaft 28 adjacent the splined head 38 constitutes a tapered portion 44 whose minimal diameter is contiguous to splined head 38, and which is provided with a steadily increasing taper therebeneath, until the full diameter of lower steering shaft 28 is obtained. The maximum diameter of lower steering shaft 28 is somewhat less than the smallest diameter of cavity 32.

A locking ring 46 comprising a split ring of spring metal, such as spring steel, resiliently embraces the tapered portion 44 of lower steering shaft 28.

A sleeve nut 48 having a radially inwardly extending shoulder 50 at its lowermost end, and open at its uppermost end, is provided on its internal surface with threads 52 which threadably engage with threads 36 on the outer surface of upper steering shaft 26. The relative position of lowermost end 53 of steering shaft 26 in respect to sleeve nut 48 may be varied by rotating sleeve nut 48. The opening in shoulder 50 is large enough to permit sleeve nut 48 to travel downwardly on the outer surface of lower steering shaft 28, but is not sufficiently large to permit the sleeve nut 48 to clear the locking ring 46.

The bore of nut 48 is sufficiently large to permit locking ring 46 to be disposed on the cylindrical portion of lower steering shaft 28.

A compression spring 54 is positioned within the axially extending cavity 32 in upper steering shaft 26 and engages against the splined head 38 of lower steering shaft 28.

The portion of lower steering shaft 28 which is on the motor side of firewall 20 is provided with an arrester 56.

The arrester 56 includes a circular flange member 58 which is bolted by means of bolts 22 to the motor side of firewall 20. The flange member 58 carries a pair of stamped metal lock nut members 60 and 62. Lock nut members 60 and 62 embrace upper steering shaft 26 and permit free downward movement of upper steering shaft 26, but arrest the upward movement of upper steering shaft 26. The portion of the steering column between firewall 20 and steering box 30 is preferably covered by a removable cover.

The height of the steering column 10 may be adjusted to fit the normal driver of the vehicle at the vehicle's point of sale or by the purchaser of the vehicle. This is accomplished by varying the relative amount of threaded engagement between sleeve nut 48 and the threaded end 36 of upper steering shaft 26. In normal driving, spring 54 urges steering shaft 26 outwardly to its normal position, and the inward radial face of shoulder 50 is engaged with locking ring 46.

Should an accident occur in which the body of the driver of the vehicle is hurled with appreciable force against the steering column 10, as would occur in a sudden stop or impact, upper steering shaft 26 would move downwardly, its splines 34 moving axially in respect to the splines 40 on splined head 38. The degree of compression required to move upper steering shaft 26 downwardly against the action of spring 54 may, of course, be regulated by changing the strength of spring 54. Such degree of compression should greatly exceed that which would be encountered in normal driving, and normal usage, as for example, when the driver brushes against the steering wheel portion 12 entering and exiting from the vehicle.

The downward movement of upper steering shaft 26 pushes locking ring 46 away from the rear end 42 of splined head 38, the end 53 of shaft 26 engaging the locking ring 46. Locking ring 46 rides on the tapered portion 44 of lower steering shaft 28, and then down the steering shaft 26. Thus, the locking ring 46 rides along the outer surface of lower steering shaft 28 being propelled downwardly by the lowermost end of upper steering shaft 26, and offering substantially no resistance to the downward movement of upper steering shaft 26. Simultaneously, housing member 16 rides downwardly on telescoped housing member 14 towards fire wall 20.

The descent of steering column 10 is permitted by arrester 56. However, lock nut members 60 and 62 in arrester 56 prevent the upward movement of steering column 10 by gripping upper steering shaft 26, so that the body of the driver is not subjected to recoil impact after the downward inertia has subsided. The steering wheel portion 12 and steering column 10 are still operable even though the steering column 10 is in its collapsed position. However, as above-indicated, arrester 56 prevents spring 54 from thrusting upper steering shaft 26 upwardly immediately after the inertia of impact of the driver's body thereon has stopped. Arrester 56 also facilitates the even descent of steering shaft 26.

In order to return the steering column 10 to its normal disposition, the hood of the vehicle is raised, and bolts 22 unscrewed. This permits dislodgement of the flange member 58 and the disengagement of lock nut members 60 and 62 from upper steering shaft 26.

The present invention may be embodied in other specific forms without departing from the spirit or essential attributes thereof and, accordingly, reference should be made to the appended claims, rather than to the foregoing specification as indicating the scope of the invention.

I claim:

1. A collapsible steering column comprising an elongated axially splined steering member, said steering member being axially immovable, a matingly splined steering wheel carrying member telescopically disposed and axially movable in respect to said steering member, one of said members having a smaller diameter than the other of said members, spring means operatively engaged with said members for axially spring-urging said steering wheel carrying member away from said steering member, a ring embracing the smaller diametered of said members, a radial projection on said smaller diametered member forming a retention shoulder for said ring, and an internally threaded tubular sleeve nut threadably engaged with the outer surface of the larger diametered of said members, and having a radially inwardly directed shoulder for operatively engaging with said ring on the smaller diametered of said members, whereby said threaded sleeve nut prevents disengagement between said members.

2. A collapsible steering column comprising an elongated axially splined steering member, said steering member being axially immovable, a matingly splined steering wheel carrying member telescopically disposed and axially movable in respect to said steering member, one of said members having a smaller diameter than the other of said members, spring means operatively engaged with said members for axially spring-urging said steering wheel carrying member away from said steering member, a ring embracing the smaller diametered of said members, a radial projection on said smaller diametered member forming a retention shoulder for said ring, and an internally threaded tubular sleeve nut threadably engaged with the outer surface of the larger diametered of said members, and having a radially inwardly directed shoulder for operatively engaging with said ring on the smaller diametered of said members, whereby said threaded sleeve nut prevents disengagement between said members, and arrester means operatively engaged with said steering wheel carrying member for preventing its axial movement away from said steering member after said steering wheel carrying member is urged towards said steering member.

3. A collapsible steering column comprising an elongated steering shaft of relatively small diameter having axially extending splines on the outer surface of the end portion thereof, said steering shaft being axially immovable, an elongated steering wheel carrying member of relatively large diameter having an axially extending cavity, axially extending splines within the cavity of said steering wheel carrying member matingly aligned with the splines on said steering shaft whereby said steering wheel carrying member may be telescopically axially moved in relation to said steering shaft, spring means disposed within the cavity of said member operatively engaged with said shaft for axially urging said member away from said steering shaft, a ring embracing the steering shaft proximate the end portion thereof, a radial projection on said steering shaft forming a retention shoulder for said ring, and an internally threaded tubular sleeve nut threadably engaged with the outer surface of said steering wheel carrying member and having a radially inwardly directed shoulder for operatively engaging with said ring on said steering shaft, whereby said threaded sleeve nut prevents disengagement between said steering shaft and said steering wheel carrying member.

4. A collapsible steering column comprising an elongated steering shaft of relatively small diameter having axially extending splines on the outer surface of the end portion thereof, a tapered neck adjacent the axially splined end portion of said steering shaft, said tapered neck having a smaller diameter than that of the axially splined end portion, said steering shaft being axially immovable, an elongated steering wheel carrying member of relatively large diameter having an axially extending cavity, axially extending splines within the cavity of said steering wheel carrying member matingly aligned with the splines on said steering shaft whereby said steering wheel carrying member may be telescopically axially moved in relation to said steering shaft, spring means disposed within the cavity of said member operatively engaged with said shaft for axially urging said member away from said steering shaft, a split ring resiliently embracing the steering shaft, and an internally threaded tubular sleeve nut threadably engaged with the outer surface of said steering wheel carrying member and having a radially inwardly directed shoulder for operatively engaging with said ring on said steering shaft, the internal diameter of said sleeve nut being larger than the width of said split ring when said split ring is expanded on the portion of the steering shaft remote from the tapered neck, said ring embracing said tapered neck of said steering shaft and operatively engaged with the end portion of said steering shaft and with said threaded sleeve nut when said spring means unopposedly urges said steering wheel carrying member away from said steering shaft, whereby said threaded sleeve nut prevents disengagement between said steering shaft and said steering wheel carrying member.

5. A collapsible steering column comprising an elongated steering shaft of relatively small diameter having axially extending splines on the outer surface of the end portion thereof, a tapered neck adjacent the axially splined end portion of said steering shaft, said tapered neck having a smaller diameter than that of the axially splined end portion, said steering shaft being axially immovable, an elongated steering wheel carrying member of relatively large diameter having an axially extending cavity, axially extending splines within the cavity of said steering wheel carrying member matingly aligned with the splines on said steering shaft whereby said steering wheel carrying member may be telescopically axially moved in relation to said steering shaft, spring means disposed within the cavity of said member operatively engaged with said shaft for axially urging said member away from said steering shaft, a split ring resiliently embracing the steering shaft, an internally threaded tubular sleeve nut threadably engaged with the outer surface of said steering wheel carrying member and having a radially inwardly directed shoulder for operatively engaging with said ring on said steering shaft, the internal diameter of said sleeve nut being larger than the width of said split ring when said split ring is expanded on the portion of the steering shaft remote from the tapered neck, said ring embracing said tapered neck of said steering shaft and operatively engaged with the axially splined end portion thereof and with said threaded sleeve nut when said spring means unopposedly urges said steering wheel carrying member away from said steering shaft, whereby said threaded sleeve nut prevents disengagement between said steering shaft and said steering wheel carrying member, and arrester means operatively engaged with said steering wheel carrying member for preventing its axial movement away from said steering shaft after said steering wheel carrying member is urged towards said steering shaft.

References Cited in the file of this patent
UNITED STATES PATENTS

| | | |
|---|---|---|
| 836,303 | Christensen | Nov. 20, 1906 |
| 2,227,821 | Burrell | Jan. 7, 1941 |
| 2,511,165 | Lyman | June 13, 1950 |

FOREIGN PATENTS

| | | |
|---|---|---|
| 888,650 | Germany | Sept. 3, 1953 |